(12) United States Patent
Billet

(10) Patent No.: US 12,460,743 B2
(45) Date of Patent: Nov. 4, 2025

(54) COMPACT CONTROL VALVE

(71) Applicant: Moving Magnet Technologies, Besançon (FR)

(72) Inventor: Lionel Billet, Dannemarie sur Crète (FR)

(73) Assignee: Moving Magnet Technologies, Besancon (FR)

( * ) Notice: Subject to any disclaimer, the term of this patent is extended or adjusted under 35 U.S.C. 154(b) by 477 days.

(21) Appl. No.: 17/596,782

(22) PCT Filed: Jun. 19, 2020

(86) PCT No.: PCT/FR2020/051072
§ 371 (c)(1),
(2) Date: Dec. 17, 2021

(87) PCT Pub. No.: WO2020/254772
PCT Pub. Date: Dec. 24, 2020

(65) Prior Publication Data
US 2022/0316618 A1    Oct. 6, 2022

(30) Foreign Application Priority Data
Jun. 20, 2019  (FR) ...................................... 1906660

(51) Int. Cl.
*F16K 37/00*   (2006.01)
*F16K 31/04*   (2006.01)
*F25B 41/35*   (2021.01)

(52) U.S. Cl.
CPC ........ *F16K 37/0033* (2013.01); *F16K 31/047* (2013.01); *F25B 41/35* (2021.01); *F16K 31/043* (2013.01)

(58) Field of Classification Search
CPC .............................. F16K 31/047; F25B 41/35
See application file for complete search history.

(56) References Cited

U.S. PATENT DOCUMENTS 2,469,794 A * 5/1949 Sloan .................... B60T 11/228
                                                        138/31
2,930,571 A * 3/1960 Vogl ...................... F16K 31/047
                                                         251/71

(Continued)

FOREIGN PATENT DOCUMENTS

CN    103370525 A    10/2013
CN    106763813 A     5/2017

(Continued)

OTHER PUBLICATIONS

International Search Report for International Application No. PCT/FR2020/051072 dated Oct. 30, 2020, 3 pages.

(Continued)

*Primary Examiner* — Angelisa L. Hicks
(74) *Attorney, Agent, or Firm* — TraskBritt

(57) ABSTRACT

A valve for controlling the circulation of a fluid, having a valve body comprising a movable control member, an electrical actuator comprising a stator and a rotor, a sealing cover extending from the valve body to the inside of the stator, the sealing cover being positioned at the interface between the rotor and the stator in such a way that the rotor is inside the cover and submerged in the fluid, the stator being isolated from the fluid, the rotor rotating about a first axis and being secured to a shaft extending along the first axis, the movable control member moving in a linear manner along a second axis or in rotation about the second axis, characterized in that the shaft has an end forming, with a toothed wheel driving the movable control member, a gear pair with non-intersecting or intersecting axes.

20 Claims, 13 Drawing Sheets

(56) References Cited

U.S. PATENT DOCUMENTS

| | | | | |
|---|---|---|---|---|
| 3,518,891 | A | * | 7/1970 | Denkowski ............. F16K 31/05 251/71 |
| 3,863,888 | A | * | 2/1975 | Hines ..................... F16K 31/05 251/129.03 |
| 4,901,977 | A | | 2/1990 | Hendrick |
| 5,327,856 | A | * | 7/1994 | Schroeder ........... F01L 13/0005 251/129.05 |
| 5,670,852 | A | | 9/1997 | Chipperfield |
| 6,460,567 | B1 | | 10/2002 | Hansen, III et al. |
| 6,561,480 | B1 | * | 5/2003 | Komiya ................ F25B 41/347 251/129.05 |
| 6,981,428 | B2 | * | 1/2006 | Donald ................ F16K 31/047 74/89.26 |
| 2002/0112760 | A1 | * | 8/2002 | Goni Usabiaga ....... F16K 29/00 137/243.6 |
| 2006/0180780 | A1 | | 8/2006 | Arai et al. |
| 2011/0031425 | A1 | * | 2/2011 | Tyler .................... F16K 31/046 251/129.11 |
| 2012/0211687 | A1 | | 8/2012 | Benjey et al. |
| 2016/0233734 | A1 | * | 8/2016 | Biwersi .................. H02K 1/146 |
| 2018/0219435 | A1 | * | 8/2018 | Billet ..................... H02K 7/116 |
| 2018/0372342 | A1 | * | 12/2018 | Chan ...................... G05D 23/19 |
| 2019/0353271 | A1 | | 11/2019 | Uehara et al. |
| 2020/0025306 | A1 | * | 1/2020 | Monnin ................ F16K 5/0605 |

FOREIGN PATENT DOCUMENTS

| | | |
|---|---|---|
| DE | 29616690 | 3/1998 |
| DE | 102017107688 | 10/2018 |
| EP | 2676027 A1 | 12/2013 |
| EP | 2725267 B1 | 3/2018 |
| JP | 60-263784 A | 12/1985 |
| JP | 63-187562 U | 12/1988 |
| JP | 01-288678 A | 11/1989 |
| JP | 08-319956 A | 12/1996 |
| JP | 08-340656 A | 12/1996 |
| JP | 2000-257689 A | 9/2000 |
| JP | 2001-141094 A | 5/2001 |
| JP | 2015-218777 A | 12/2015 |
| JP | 2018-135908 A | 8/2018 |
| KR | 10-2016-0071147 | 6/2016 |
| WO | 2012/110889 A1 | 8/2012 |
| WO | 2018/096246 A1 | 5/2018 |
| WO | 2018/126214 A1 | 7/2018 |
| WO | 2018/180041 A | 10/2018 |
| WO | 2019/110923 A1 | 6/2019 |

OTHER PUBLICATIONS

International Written Opinion for International Application No. PCT/FR2020/051072 dated Oct. 30, 2020, 10 pages.

Chinese Search Report for Chinese Application No. 202080044811, dated Mar. 28, 2024, 1 page.

Japanese Notice of Reasons for Refusal for Japanese Application No. 2021-574926, dated Mar. 12, 2024, 16 pages with English translation.

Chinese Office action for Chinese Application No. 202080044811, dated Mar. 20, 2025, 10 pages.

* cited by examiner

COMPACT CONTROL VALVE

CROSS-REFERENCE TO RELATED APPLICATIONS

This application is a national phase entry under 35 U.S.C. § 371 of International Patent Application PCT/FR2020/051072, filed Jun. 19, 2020, designating the United States of America and published as International Patent Publication WO 2020/254772 A1 on Dec. 24, 2020, which claims the benefit under Article 8 of the Patent Cooperation Treaty to French Patent Application Serial No. 1906660, filed Jun. 20, 2019.

TECHNICAL FIELD

The present disclosure relates to a compact control valve intended to control the circulation of a fluid, either liquid or gaseous, for example, as an expansion device for an air conditioning circuit, which valve is actuated by a brushless electrical motor.

BACKGROUND

The present disclosure is preferably for, but not limited to, the field of flow control valves for air conditioning or battery cooling circuits. The distinctive feature of these systems is the need to keep the heat transport fluid in a sealed circuit. The solution generally implemented, which ensures this seal while allowing sustainable actuation, is to separate the stationary part, which is not submerged in the fluid, of a brushless electrical motor or of a solenoid, generally the stator of the motor, from a movable element that moves in the fluid circuit, the separation being carried out by a sealed non-magnetic element. It is then possible to control the flow rates without compromising the seal of the cooling circuit. These control systems need to be very compact and energy efficient and must have a high degree of control precision and adaptability to the various mechanical configurations of the fluid circuit.

Moreover, in the context of using these valves, the control devices must develop forces greater than 300 N, or even greater than 400 N, because the needles can have large cross sections (typically greater than 25 mm$^2$) under pressures that can exceed 15 MPa.

Document EP2725267, which discloses a gear motor using a motor connected to the needle by means of a reduction device in the form of spur gears that rotate a screw along a line that is parallel to but not concurrent with the motor, is known in the prior art for achieving such forces in control valves using needles. The linear component of the helical motion is thus used to move the needle in a linear manner. This solution is not particularly axially compact and uses a motor, which must be statically sealed by insulating the electrical wires from the fluid in which the motor is immersed. This device is complex to manufacture.

Document US20060180780, which proposes a more compact gear motor and which incorporates, inside a sealing cover, an axial flux motor rotor and a mechanical movement reducer in the form of a planetary gear train, is also known. The reducer is housed inside the rotor of the motor, ensuring a certain degree of compactness, and, compared to the previous document, avoiding the use of sealed motor connections, the sealing being implemented by the cover that encompasses the rotor and reducer gear train.

However, in this previous solution, the dimensioning of the motor is intrinsically linked to that of the reduction train and the little volume generally available inside a motor rotor means that the parts for the motion reducer have to be small. This results in manufacturing constraints and very high part tolerances, which make the solution uneconomical, and also leads to wear. In addition, this issue with dimensioning the motor and the reducer means low variability of the reduction ratio, and ultimately of the force, which it is possible to achieve. This results in rigid and inflexible dimensioning. The resulting large axial size is also relatively large due to the stacking of the various mechanical elements present. This size is not always compatible with the requirements of the system. Moreover, if integration of a position sensor is intended, this axial bulk becomes even greater and even more problematic. Finally, in the field of air conditioning systems based on the fine metering of volumes of phase-changing fluids, a high degree of cleanliness of the fluid and of the networks transporting this fluid is required. It is essential from the point of manufacture that particles capable of blocking, preventing complete closure of, or modifying the passages inside the system are either absent or present only in a small, controlled number and with a controlled diameter. It is also essential to ensure that there is no fluid leakage during the life of the system in order to guarantee the performance and reliability of the cooling system (air conditioning, batteries, etc.) and not to pollute the environment. These systems are therefore usually produced entirely in an environment with controlled pollution and tightness, which generates additional costs.

BRIEF SUMMARY

The present disclosure aims to overcome the drawbacks of the prior art by producing an actuator, which is more axially compact, more flexible with regard to dimensions, more efficient, and more reliable than those of the prior art, and which optimizes the costs of mass production.

In particular, the present disclosure is thus intended to provide a flexible and compact solution that can be adapted to develop both low forces (typically 20 N) and greater forces (typically 400 N) with an axial size more compact than that proposed by the prior art.

To this end, the present disclosure proposes using a gear pair with non-intersecting or intersecting axes so as to have the benefit of a large reduction ratio (typically ranging from 1:10 to 1:40) and produce a high degree of axial compactness while keeping a simple sealing cover, which avoids dynamic sealing and sealing of the connector. By way of example, the gears considered are the following: a worm gear pair, a bevel gear pair, a hypoid gear pair. The parallel gear pairs used widely in fluid control valve applications do not allow high reduction ratios to be achieved or do so with significant bulk or increased complexity, as described above.

Moreover, the present disclosure makes it possible to limit construction in a controlled environment to what is strictly necessary, i.e., to the parts that transport the fluid and not to the stator parts linked to the electrical motor. All the magnetic parts of the stator and the electronics can be produced mechanically and constructed outside the controlled pollution zone, i.e., without limitation of techniques. Since all the guides and seals are produced by these sub-assemblies, the reduction and motion transformation elements, the stops, and the fluid passages can be assembled and tested outside the valve body, then inserted in the final position. The stator part can be assembled after complete construction and testing of the refrigerant fluid circuit. The latter does not have a seal with respect to the refrigerant fluid.

More specifically, the present disclosure relates to a fluid circulation control valve, having a valve body comprising a movable control member, an electrical actuator comprising a stator and a rotor, a sealing cover extending from the valve body to the inside of the stator, the sealing cover being positioned at the interface between the rotor and the stator in such a way that the rotor is inside the sealing cover and submerged in the fluid, the rotor rotating about a first axis and being secured to a shaft extending along the first axis, the movable control member moving in a linear manner along a second axis or rotating about the second axis, characterized in that the shaft has an end that forms, together with a toothed wheel that drives the movable control member, a gear pair with non-intersecting or intersecting axes.

The present disclosure also relates to a device having the following features, taken in isolation or in any technically conceivable combination:

- the movable control member is a needle that moves in a linear manner.
- the second axis is orthogonal to the first axis of the rotor and the end is threaded and drives a toothed wheel rotating about the second axis.
- the end is toothed and drives the toothed wheel, thus forming a bevel gear pair.
- the toothed wheel rotates a hub, the hub is secured to a screw, a stationary nut is arranged upstream of the hub, forcing the hub to move helically while the toothed wheel is rotating, and the hub is in contact with the needle.
- the hub has a spherical end that bears against the needle, and a compression spring maintains constant contact between the needle and the hub.
- the contact is sliding, eliminating the rotational component of the needle.
- the second axis and the second axis are such that the planes orthogonal to the axes are not mutually orthogonal.
- the movable control member is in the form of a plug that rotates about the second axis.
- the valve has a rotation sensor for the rotor, which sensor consists of a magnetosensitive probe that is secured to a printed circuit outside the cover and of at least one magnetic element that is secured to the rotor inside the cover and generates the magnetic field.
- the valve has a linear position sensor for the needle, which sensor consists of a magnetosensitive probe and of at least one magnetic element that is secured to the movable control member and generates the magnetic field.
- the stator of the electrical actuator has only three coils grouped together in an angular sector of less than 180°.
- the cover is a metal cover arranged in the electrical actuator.
- the cover is a plastics wall surrounding the stator of the actuator. This material may or may not be an overmold material.
- the movable control member rotates about the second axis and the shaft is guided by only two bearings located at the ends thereof.
- the valve body comprises two cavities that accommodate the movable elements, the cavities being produced in two rotational machining processes along two separate axes, and it being possible for the cavities to have cylindrical cross sections of different diameters.
- the stator and the electronics board can be attached to the casing, the whole of which can be fixed to the sealed valve block once all operations in a controlled environment have been completed.

The present disclosure also relates to an expansion device for an air conditioning circuit or for cooling a battery, having a valve body comprising a movable control member, an electrical actuator comprising a stator and a rotor, a sealing cover extending from the valve body to the inside of the stator, the sealing cover being positioned at the interface between the rotor and the stator in such a way that the rotor is inside the sealing cover and submerged in the fluid, the stator being isolated from the fluid, the rotor rotating about a first axis and being secured to a shaft extending along the first axis, the movable control member moving in a linear manner along a second axis or rotating about the second axis, characterized in that the shaft has an end that forms, together with a toothed wheel that drives the movable control member, a gear pair with non-intersecting or intersecting axes.

BRIEF DESCRIPTION OF THE DRAWINGS

Other features and advantages of the present disclosure will become clear upon reading the following detailed embodiments, with reference to the accompanying drawings, in which.

DETAILED DESCRIPTION

Figure 1:
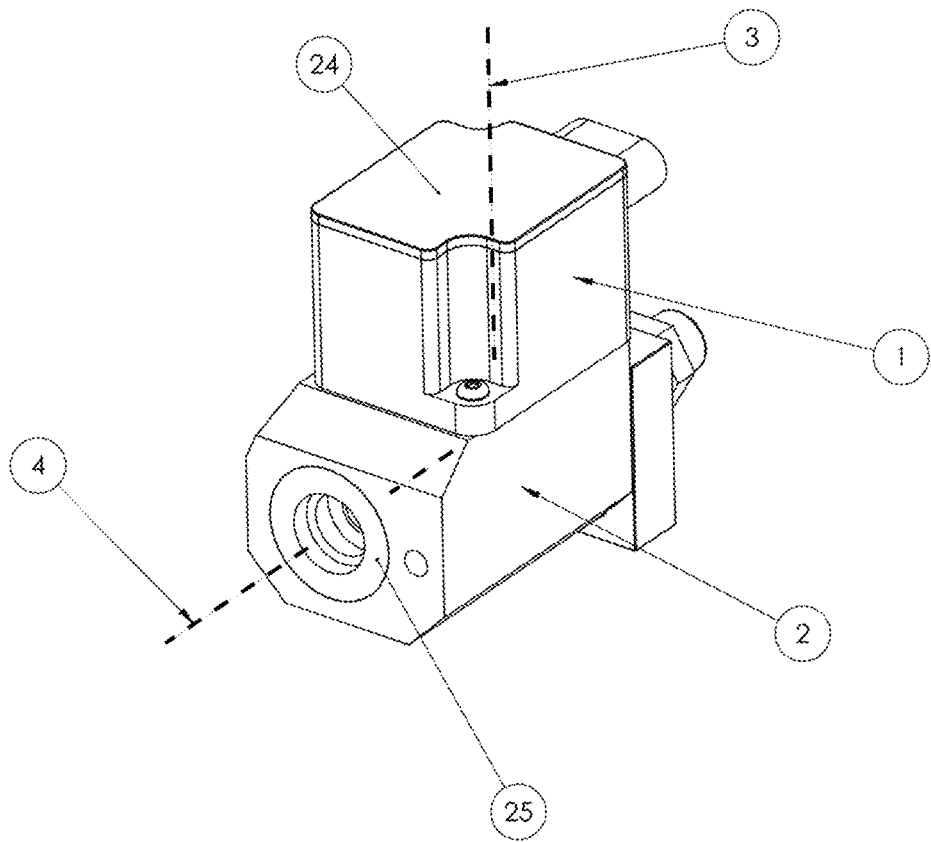
FIG. 1 is a perspective view of a valve according to the present disclosure in a first embodiment of the present disclosure.

FIG. 1 is an isometric view of a first embodiment of a valve according to the present disclosure that links an electrical actuation assembly and a mechanical assembly, creating a circulation path for a heat transport fluid. More specifically, the valve thus consists of an electrical actuator (1), which, by means of a rotor rotating around the rotational axis (3), rotates a mechanical shaft having a thread (not visible here). The actuator (1) is fixed to the valve body (2), which comprises the passage channels (25) of a heat transport fluid, the flow rate of which is managed by a needle. The needle of the valve (not shown here) and the elements of the reducer other than the mechanical shaft linked to the rotor, are positioned along an axis (4) that is not parallel to the axis (3). The electrical actuator (1) has a cap (24) on the upper part and is fixed to the valve body (2). The solution presented here is thus more compact along the axis (4) of the needle than those from the prior art documents.

Figure 2:
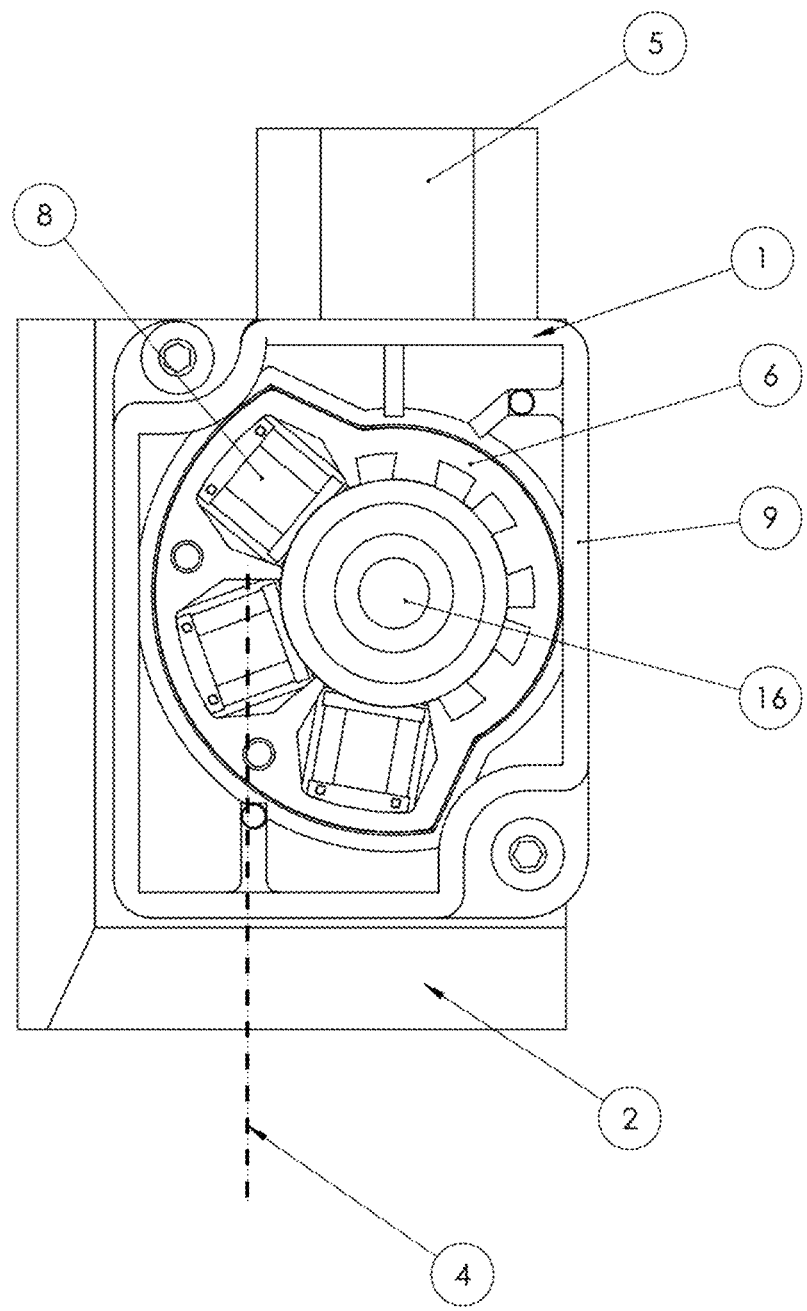
FIG. 2 is a plan view of the device from FIG. 1 with no cap.

FIG. 2 is a plan view of the first embodiment without a cap, which makes it possible to see the electrical actuator (1) with radial magnetic flux typically used in the present disclosure. This electrical actuator (1) is only one possible non-limiting example. It has a stator (6) formed by a laminated core that forms teeth, electrical coils (8), here 3 coils at 60 mechanical degrees from each other, being placed on some of the teeth. The particular shape of the stator, here having coils extending approximately inside an angular sector of less than 180°, allows the rotor to be positioned remotely from the plane of symmetry of the actuator without increasing the overall footprint of the electrical actuator (1) on the valve body (2). The angular positioning freedom of the coils allows simple orientation of the electrical actuator (1), particularly of its connector (5), according to the needs of the entire system in which it is integrated. The electrical actuator (1) is encompassed by a casing (9), which may be a housing in which the actuator is placed or an overmolded plastics material. In this view without the cap (24), it is possible to see a sealing cover (16) inside which is placed the rotor (not visible) of the actuator (1), this element being submerged in the fluid to be controlled. Outside this cover are the stator (6) and the coils (8), isolated from the fluid. As shown by dashed lines, the axis (4) of the needle is orthogonal to the axis (3) of the rotor, these two axes (3, 4) being, in this example, non-intersecting.

Figure 3:
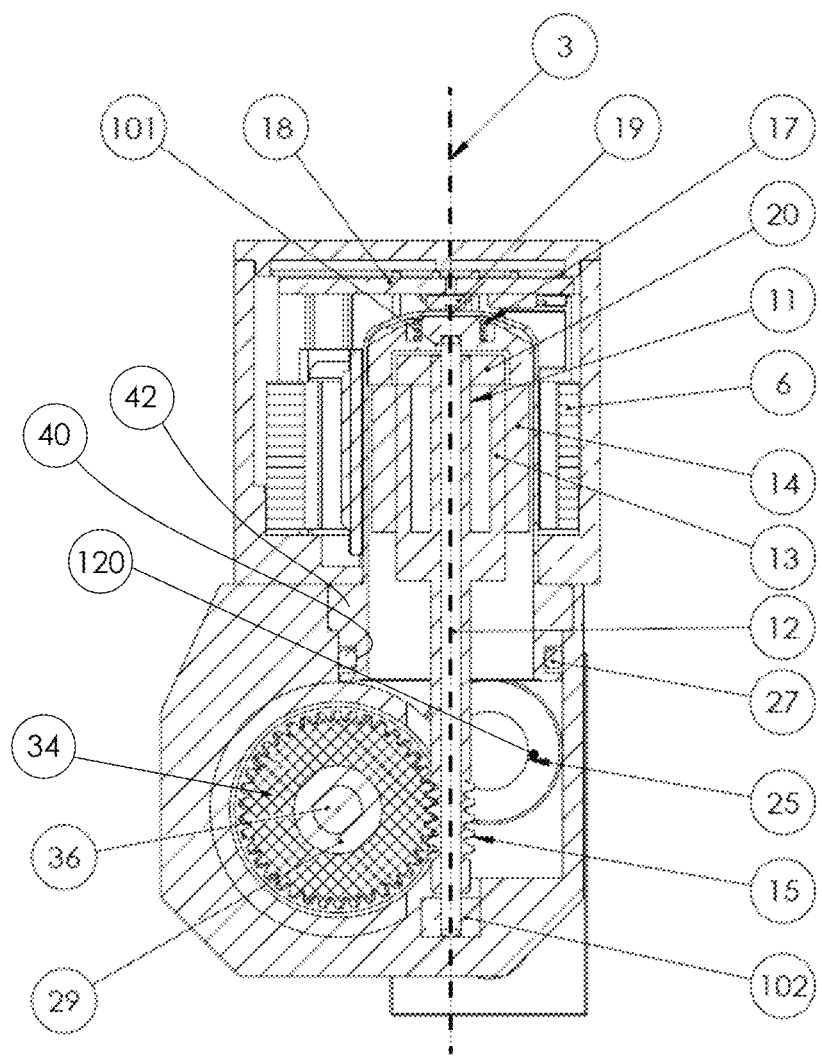
FIG. 3 is a transverse cross-sectional view of the device from FIG. 1.

FIG. 3 is a transverse cross section of a valve according to this first embodiment. The valve body (2) has fluid inlet and outlet circulation channels (25). The rotor (11) of the electrical actuator (1) consists of a shaft (12) and a molded part (13), which forms, in this particular embodiment, a support for permanent magnets (14) that interact magnetically with the flux produced by the electrical coils (8) of the stator (6). The molded part (13) has a threaded end (15), which is part of a mechanical reducer of the worm gear pair type. The rotor (11), via the threaded end (15), rotates a toothed wheel (34) rotating about the axis (4) according to a ratio proportional to the number of teeth of the toothed wheel (34) divided by the number of threads. The threaded end (15) can also be provided on the shaft (12) and is not exclusively produced by the molded part (13) in a variant. The toothed wheel (34) drives a hub (36), which has a cross section with two flat portions. These flat portions, which are in no way limiting in their shape and number, allow the hub (36) to be rotated in mechanical interaction with a mating shape (29) corresponding to the center of the toothed wheel (34).

A compression spring (17), located above the rotor (11), makes it possible to position the rotor axially and to keep the rotor (11) axially stressed, generating a preload that takes up the mechanical play. This allows the rotor (11) to remain in position even if the actuator has no electrical supply and prevents the rotor (11) from oscillating under vibrations by introducing a friction torque induced by the thrust of the spring. A magnetic element (20) linked to the rotor generates a magnetic field, which can be measured by a magnetosensitive probe (19) carried by a printed circuit (18), thus making it possible to monitor any controlled or uncontrolled movement of the rotor (11). The printed circuit (18) and the magnetosensitive probe (19) are positioned outside the cover (16) away from the fluid.

FIG. 3 illustrates the advantage of the present disclosure, allowing the use of a cover with a diameter slightly greater than the diameter of the rotor and not dimensioned by the size of the elements of the reducer. This cover of small diameter will have better mechanical strength at a given thickness in the event of high pressure than a cover of large diameter. Moreover, a static seal (27) of the O-ring type, which prevents compressed fluid from leaking to the outside of the device, can be seen in FIG. 3, which shows the seal (27) disposed within a groove (40) in a base (42) of the cover (16) and providing a fluid-tight seal between the valve body (2) and the base (42) of the sealing cover (16). It should be noted that the present disclosure does not require a dynamic seal or the sealing of the connections of the motor.

In this embodiment, the shaft (12) is fully guided at the ends thereof by guides (101, 102). This arrangement, with no central guides, facilitates the connection of the rotor (11) to the elements of the motion reducer. This embodiment is particularly suited to mass production.

Finally, FIG. 3 shows the particular simplicity of the production of the valve body that it is possible to achieve using a limited number of rotational machining processes to accommodate the internal movable elements. In the embodiment shown in FIG. 3, only two rotational machining processes are carried out in the valve body in order to obtain the cavities accommodating the internal sub-assemblies. Thus, a first rotational machining process along the axis (3) makes it possible to obtain the cylindrical internal cavity (120) that accommodates a sub-assembly containing the rotor (11) and the sealing cover thereof. The latter cylindrical internal cavity (120) can have cross sections of different diameters but can be produced in a single operation. Likewise, a second machining process along the axis (4) makes it possible to obtain the internal cylindrical cavity that accommodates a second sub-assembly containing the other elements of the motion reducer as well as the flow rate control device. The sub-assemblies (110, 111) preferably have rotationally symmetrical shapes complementary to the shapes of the valve body, and the angular or linear indexing required during mounting in the final valve system is therefore reduced.

Figure 4:
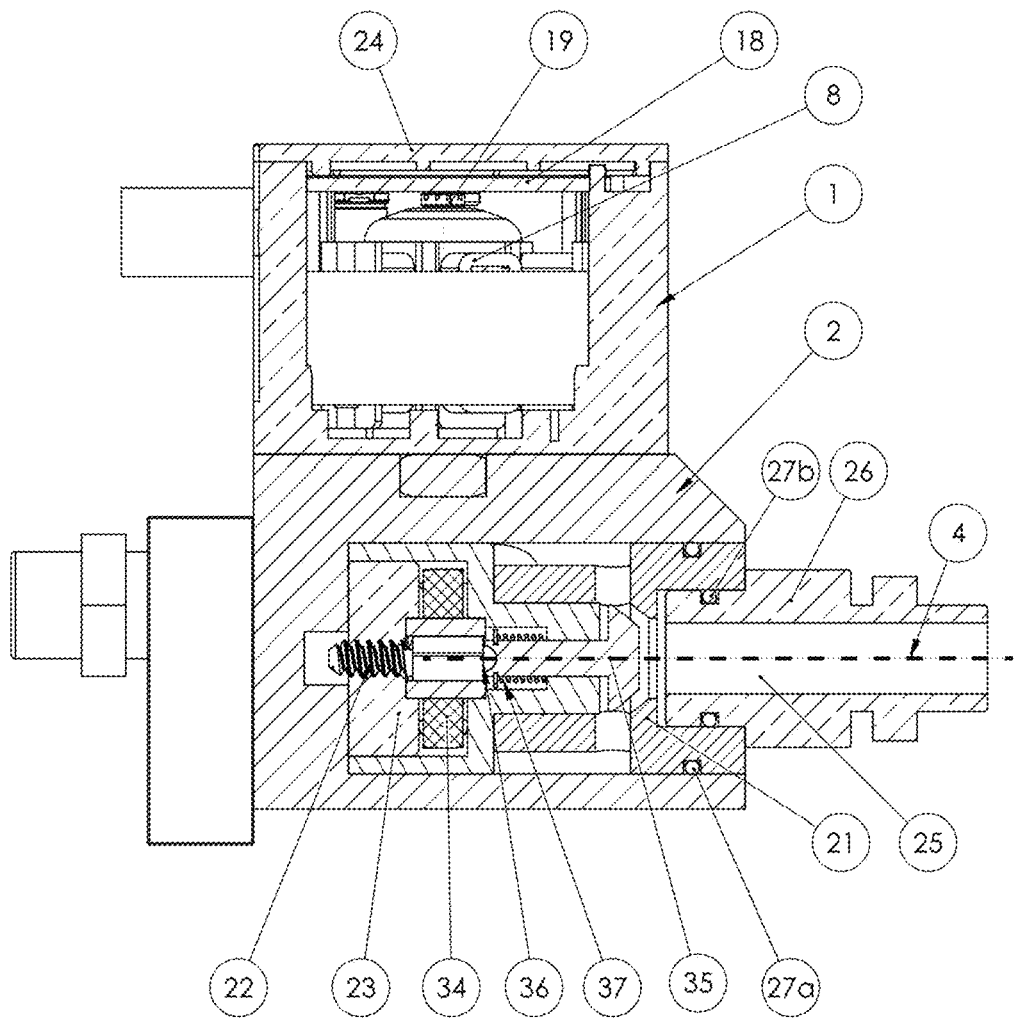
FIG. 4 is a longitudinal cross-sectional view of the device from FIG. 1 with the needle allowing the fluid to circulate.

FIG. 4 is a cross section of a valve according to this first embodiment. The valve body (2) has inlet and outlet circulation channels (25) for the heat transport fluid. The passage of fluid is managed by the positioning of the end of the needle (35), managed by the electrical actuator (1), along the axis (4), in order to bring this needle end (35) closer or further away from the needle seat (21). A screw (22) is rotated by the toothed wheel (34) with the aid of the hub (36) having the two flat portions and generates an axial movement (4) by bearing against the mating threaded part of a stationary nut (23) linked to the valve body (2) and located upstream of the toothed wheel (34) on the axis (4). The hub (36) bears against the needle (35). In the case shown, but in a nonlimiting manner, the bearing is produced by means of a spherical shape (28) at the end of the hub (36) in a complementary shape to reduce the sensitivity to center distance faults of the different elements. A spring (37) ensures that the hub (36) makes contact with the needle (35) even in the absence of force on the needle (35). Channels (not visible) provided in the parts guiding the needle allow the passage of the fluid. The part forming the seat (21) of the needle (35) may have a housing intended to receive the connection elements (26) of the heat transport fluid, thus minimizing the number of machining processes required in the valve body (2). Static seals (27a, 27b) provide the seal.

The magnetosensitive probe (19) is carried by a printed circuit (18) located above the cover (16), under the cap (24). This printed circuit (18) also carries the connection points to the coils (8) of the actuator (1) as well as the electronic components necessary for controlling the polyphase electrical motor.

Figure 5:
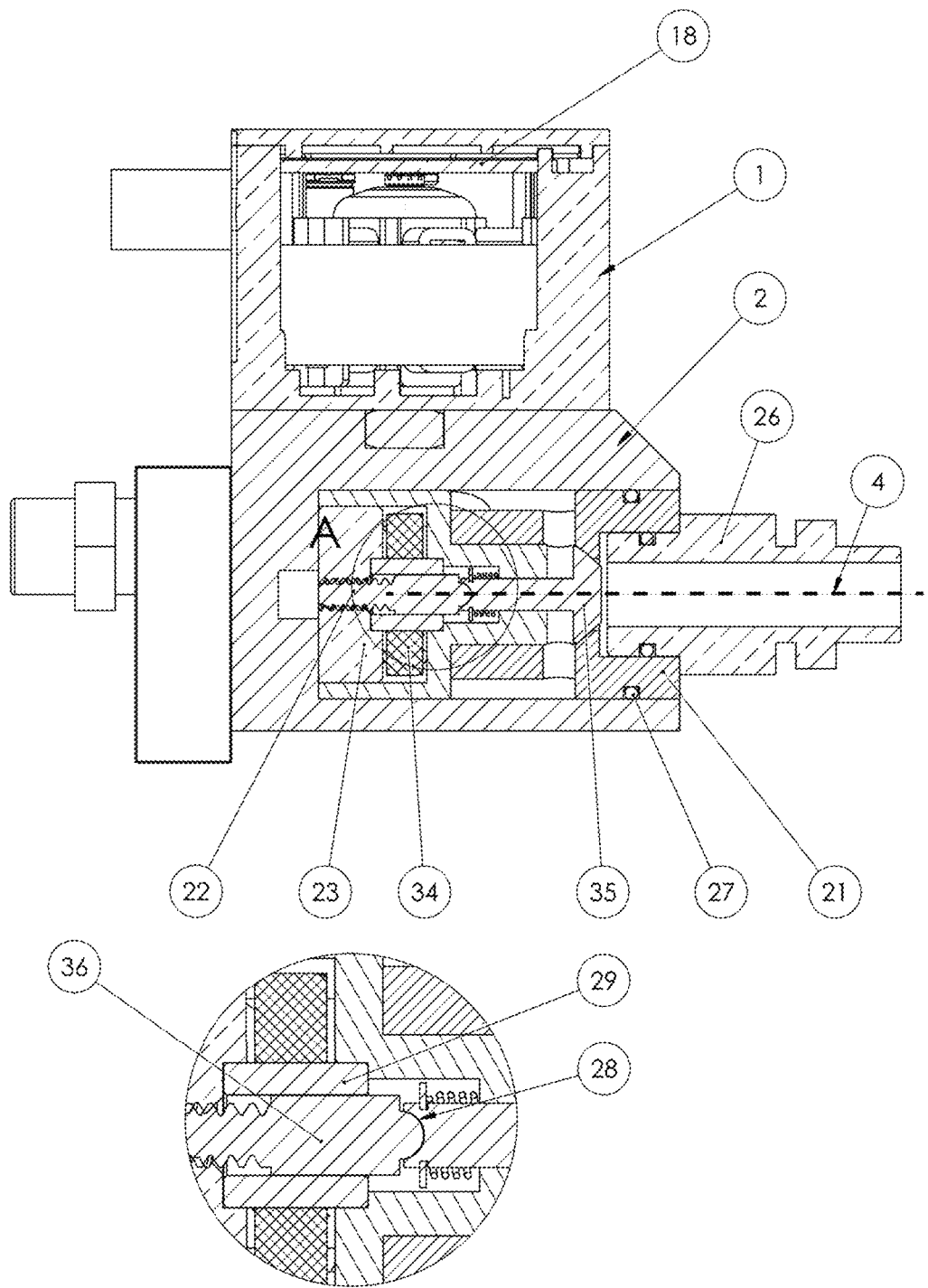
FIG. 5 is a longitudinal cross-sectional view and an isolated view of the device from FIG. 1 with the needle closing the circuit.

FIG. 5 shows this same device with the needle (35) in the closed position. The isolated view in a circle at the bottom is an enlargement of the drive zone, making it possible to see the hub (36), which is rotated by the toothed wheel (34) and which slides in a linear manner inside the wheel by the helical motion forced by the screw (22). It also allows a better view of the spherical shape (28) bearing against the needle (35), which makes it possible to keep only the linear motion at the needle (35) by allowing the spherical form (28) to slide rotationally on the head of the needle (35).

Figure 6:
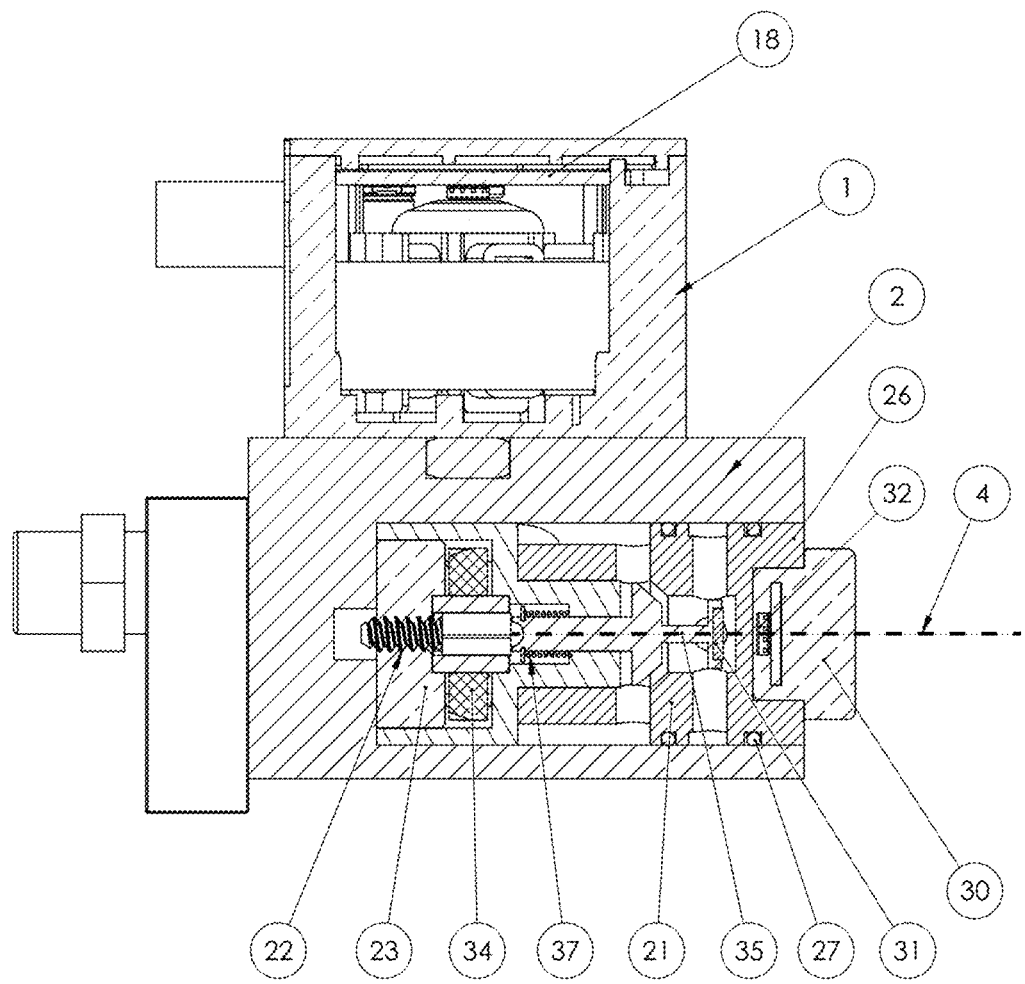
FIG. 6 is a longitudinal cross-sectional view of the device, with which a needle movement sensor is associated.

FIG. 6 shows this same device with the needle (35) in the open position, to which device a magnetic element (31) has been added, allowing a support (30) equipped with a magnetosensitive probe (32) to receive the linear position of the needle (35). Compared with the detection solution facing the rotor described above, this configuration makes it possible to overcome the mechanical play inherent in the mechanical motion transformation system and to determine the real position of the needle (35).

Figure 7:
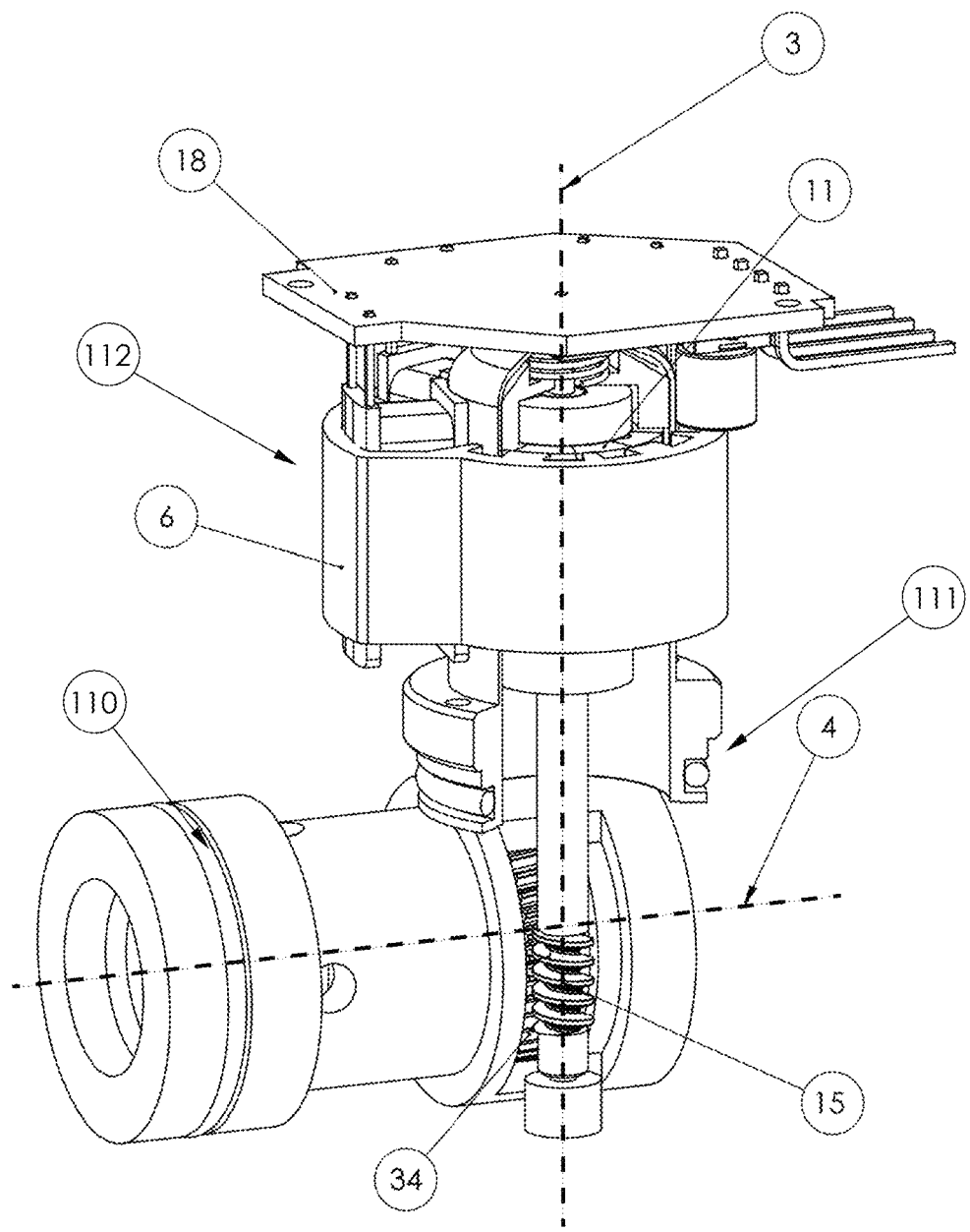
FIG. 7 is a perspective view and partial section of the device from FIG. 1 where the valve body has been hidden, making it possible to see the transformation of motion.

FIG. 7 is an isometric view of this first embodiment where the valve body has been hidden, which allows the reducer part with the threaded end (15) of the shaft (12) linked to the rotor (11) and the toothed wheel (34) linked to the needle (35) to be seen in more detail. This figure also shows the three sub-assemblies attached to the valve body (not shown). A first-sub-assembly (110) contains movable elements including the element limiting the flow rate of fluid. A second sub-assembly (111) contains movable elements including the rotor attached to the sealing cover. The sub-assemblies (110, 111) have cylindrical shapes complementary to the two rotational machining processes of the valve body, allowing assembly to be simplified and a sealed valve to be obtained. In addition, the sub-assemblies (110, 111) can be assembled and tested independently of the valve body, this construction advantageously accelerating handling in a pollution-controlled environment. A third sub-assembly (112) containing the stator (6), the elements used for controlling the stator, such as the connections and the electronics board, and the casing or overmold (not shown), can be attached to the sealed valve in uncontrolled environment. This assembly does not require an additional costly sealing operation.

Figure 8:
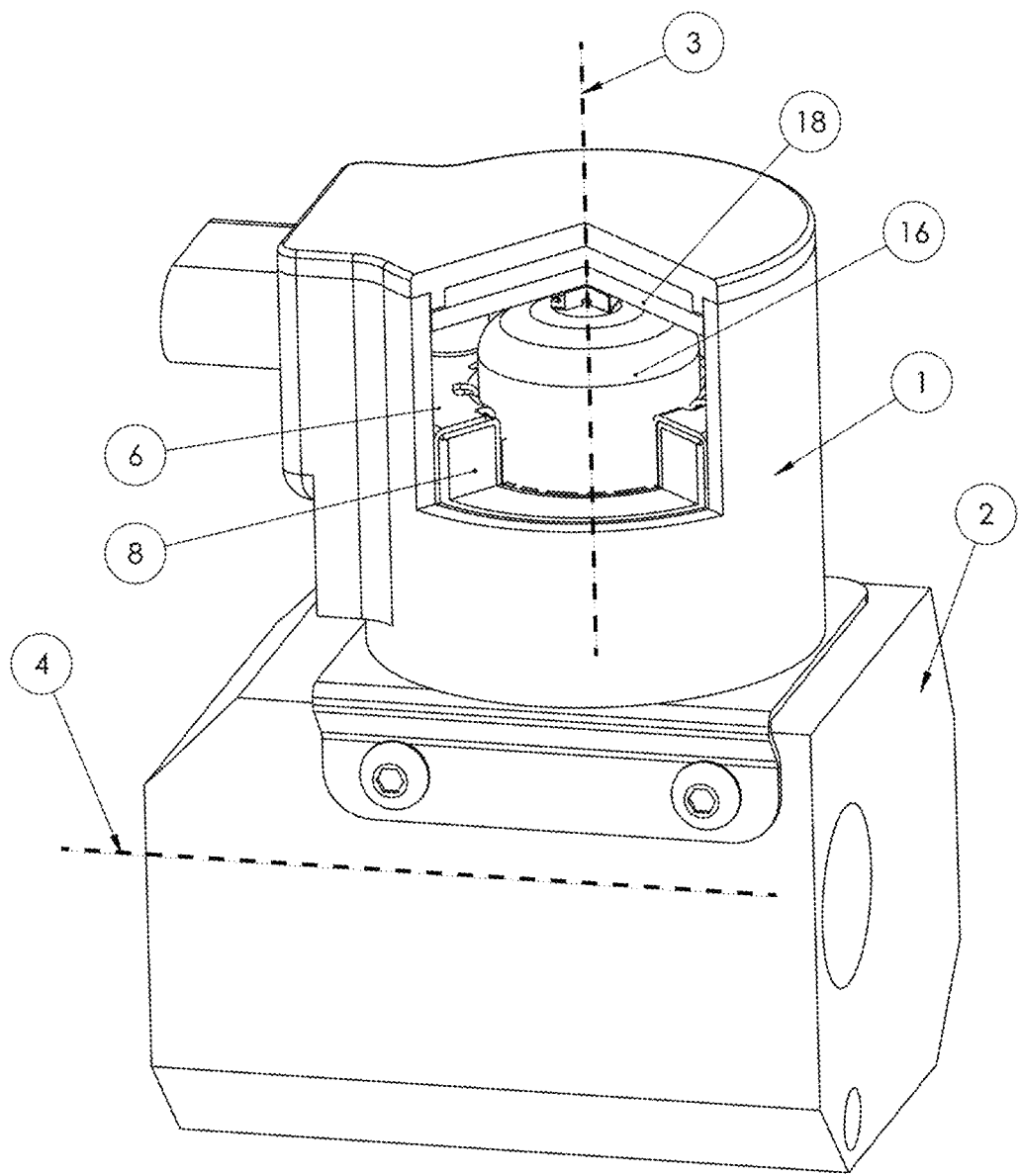
FIG. 8 is a perspective view of an alternative embodiment where the actuator used is an axial flux actuator.

FIG. 8 shows a second variant in which the electrical actuator is an axial flux actuator characterized by a cylindrical shape, with electrical coils (8) concentric with the axis (3) of the actuator. This figure illustrates the variability allowed by the present disclosure in the use of different electrical motor topologies without limitation in shape or type. Therefore, the two examples given in this document are in no way limiting.

Figure 9:
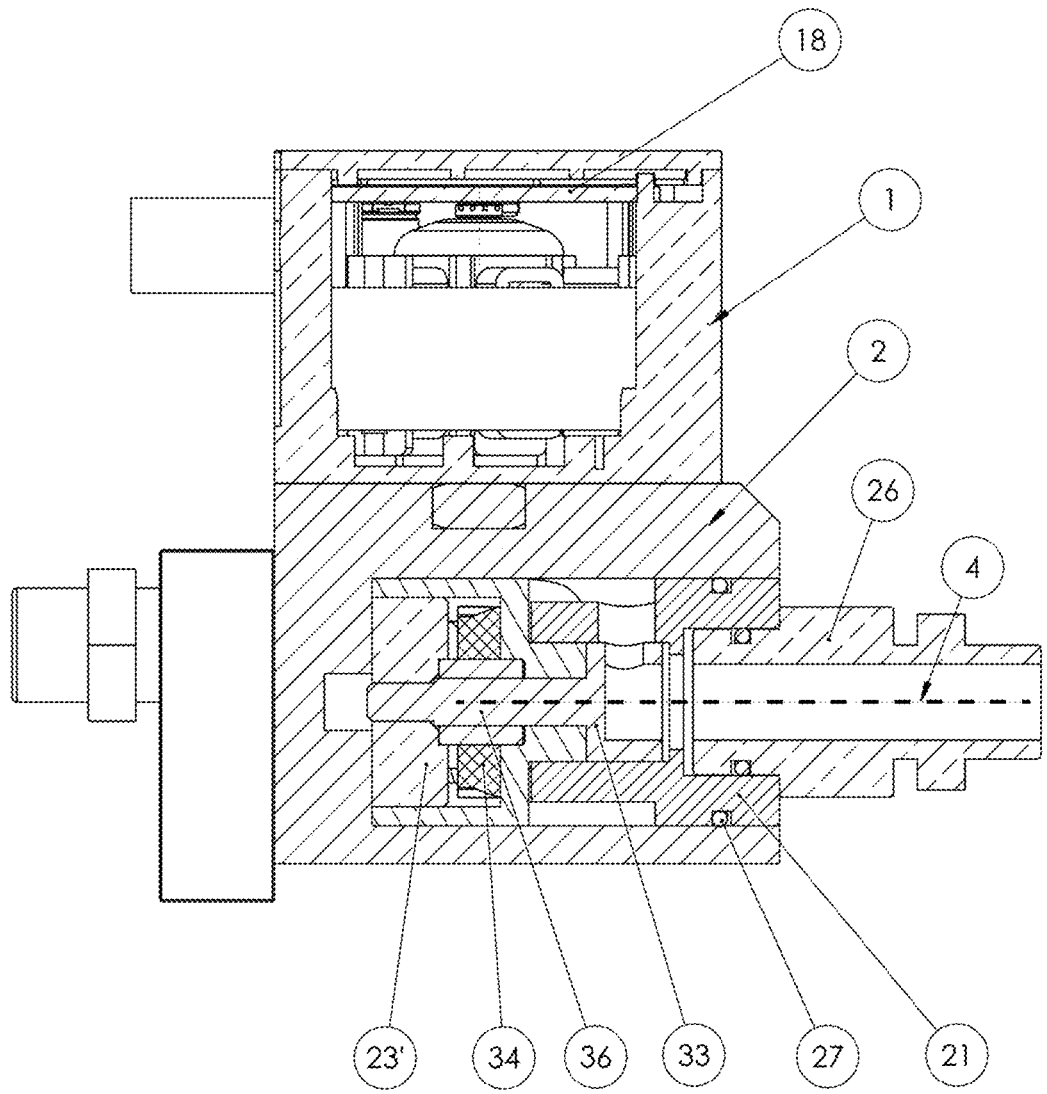
FIG. 9 is a variant of a rotary flow rate control device.

FIG. 9 shows a solution for controlling the flow rate of fluid by a rotary plug (33) that is secured to the hub (36). The number of outlets is not limited to one. Simple guidance by a smooth bearing (23'), instead of the screw-nut system described above, is carried out upstream of the hub (36). A simple rotation of the hub, without translation, is necessary in this example. The part forming the seat (21) of the rotary plug (33) can have a housing intended to receive the connection elements (26) of the heat transport fluid, thus minimizing the number of machining processes required in the valve body (2).

Figure 10:
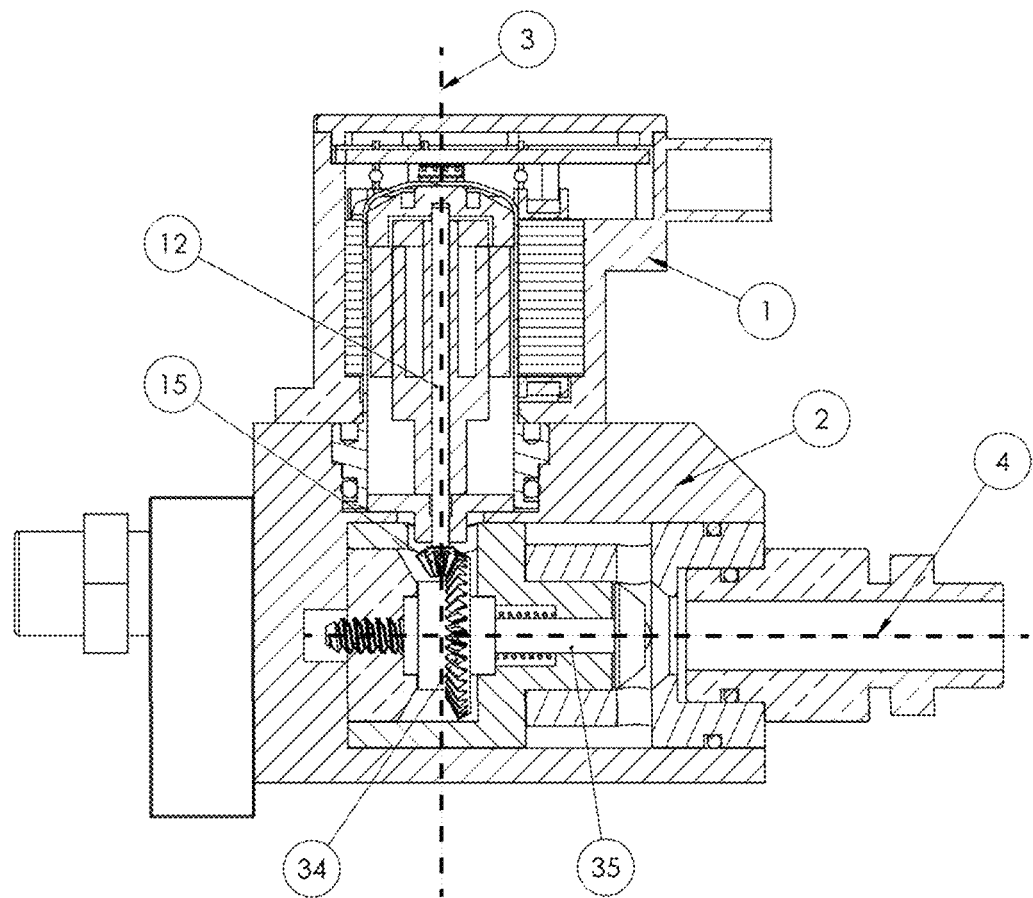
FIG. 10 is another variant comprising an alternative reduction by bevel gear pairs.

FIG. 10 shows an alternative reduction by bevel gear pairs. The end of the shaft (15) has a toothed and conical shape and meshes with a conical toothed wheel (34), the rotational axis of which is the axis (4) of the needle (35). The axes can be intersecting or non-intersecting.

Figure 11:
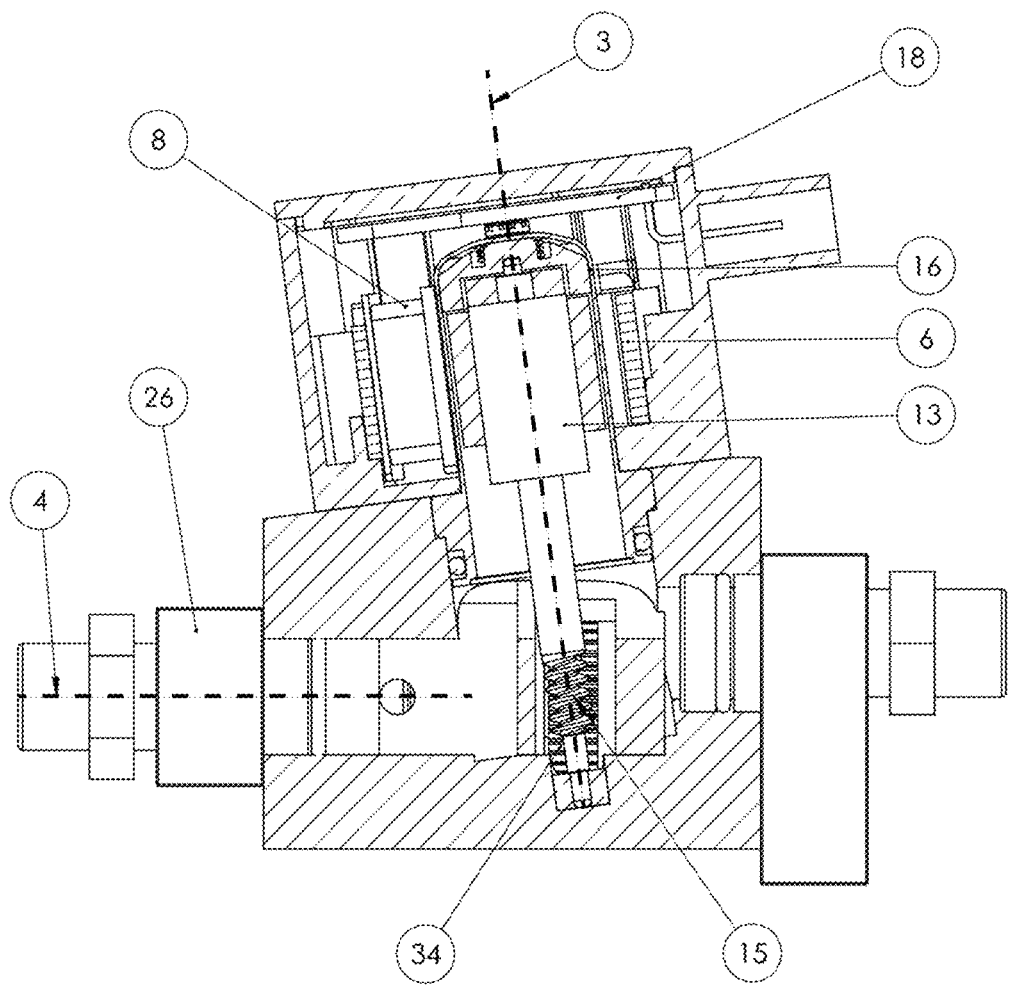
FIG. 11 is a variant comprising a reduction where the axes of the actuator and the needle are non-orthogonal and non-parallel.

FIG. 11 shows another alternative construction of the gear where the gear is of the worm gear pair type and where the rotational axis (3) of the rotor (11) and the movement axis (4) of the needle are such that the planes orthogonal to the axes (3, 4) are not mutually orthogonal. This embodiment makes it possible, in particular, to adapt the bulk with respect to the reduction ratio while retaining the advantages described above. The advantage of this embodiment is also to be able to produce a toothed wheel (34), which is molded because it is upright.

Figure 12:
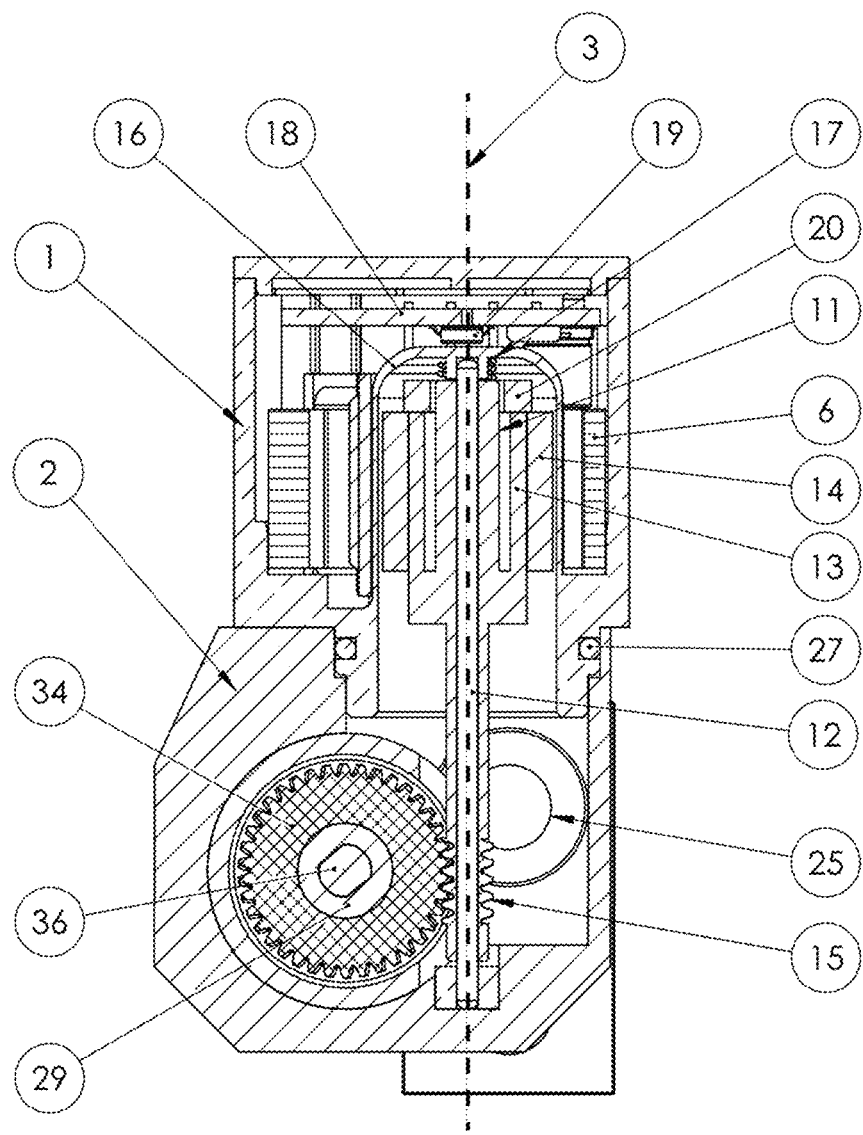
FIG. 12 is a variant where the sealing cover is produced by a wall of material surrounding the stator of the actuator.

FIG. 12 shows a version using a cover (16), which is made of plastic and which is an extension of the actuator casing, i.e., the part surrounding the stator (6) and forming the interface with the exterior. The plastics material may be an injection molding material, the stator (6). This solution of using a plastics cover is nevertheless reserved for cases where the pressure of the fluid to be controlled is lower because the pressure resistance is lower than that permitted with the metal cover shown in the other drawings.

Figure 13:
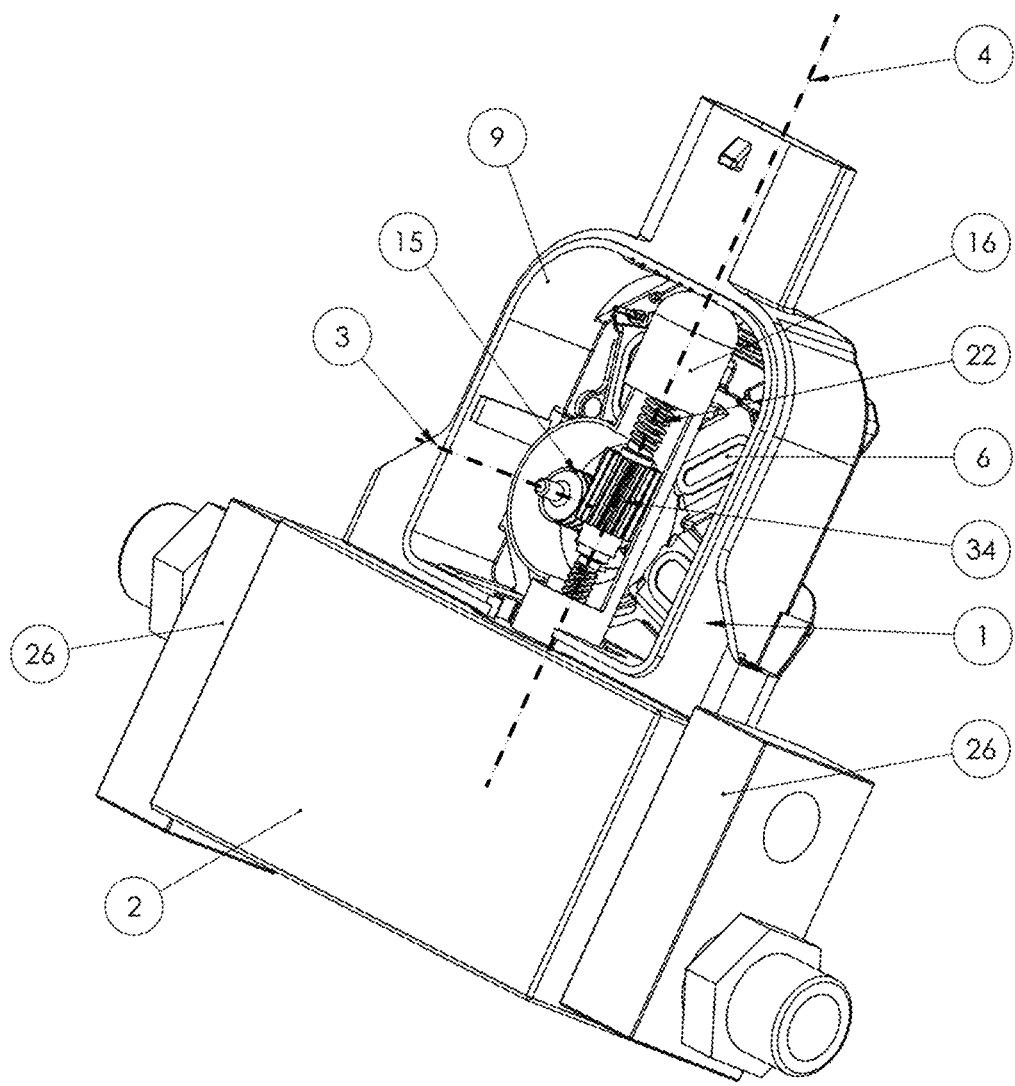
FIG. 13 is a variant that implements a flat electrical actuator.

FIG. 13 shows an alternative embodiment using an actuator (1) that is flat or box-shaped. The stator (6) of the electrical motor is flat and installed on the bottom of the casing (9). The rotor (not visible) is secured to a shaft, the end (15) of which forms, together with a toothed wheel (34) guided by a screw (22) extending upstream therefrom, a screw-nut type transformation. The rotor and the toothed wheel (34) are inside a sealing cover (16), the shape of which is adapted to this screw-nut type transformation. The toothed wheel (34) is extended downstream by a screw, which drives a control member (not visible) in a manner similar to that which can be seen in FIG. 7, for example.

In all of the examples presented here, the fluid may or may not pass through the reducer zone.

The invention claimed is:

1. A fluid circulation control valve, comprising: a valve body having a movable control member, an electrical actuator comprising a stator and a rotor, a sealing cover extending from the valve body to the inside of the stator, the sealing cover being positioned at an interface between the rotor and the stator in such a way that the rotor is inside the sealing cover and submerged in the fluid, the stator being isolated from the fluid, the rotor configured to rotate about a first axis and being secured to a shaft extending along the first axis, the movable control member configured to move in a linear manner along a second axis or to rotate about the second axis, the shaft having an end that forms, together with a toothed wheel that drives the movable control member, a gear pair with non-intersecting or intersecting axes, wherein a base of the sealing cover is inserted into the valve body and comprises a groove, a seal member disposed within the groove and providing a fluid-tight seal between the valve body and the base of the sealing cover, and wherein the sealing cover is directly fixed to the valve body.

2. The valve of claim 1, wherein the movable control member comprises a needle that moves in a linear manner.

3. The valve of claim 2, wherein the second axis is orthogonal to the first axis of the rotor and the end is threaded and drives a toothed wheel rotating about the second axis.

4. The valve of claim 3, wherein the toothed wheel rotates a hub, the hub is secured to a screw, a stationary nut is arranged upstream of the hub, the nut forcing the hub to move helically while the toothed wheel is rotating, and the hub is in contact with the needle.

5. The valve of claim 4, wherein the hub has a spherical end that bears against the needle, and a compression spring maintains constant contact between the needle and the hub.

6. The valve of claim 5, wherein the contact is sliding, eliminating the rotational component of the needle.

7. The valve of claim 2, wherein the end is toothed and drives the toothed wheel, the toothed end and the toothed wheel forming a bevel gear pair.

8. The valve of claim 1, wherein the second axis of the movable control member and the first axis are such that planes orthogonal to the first and second axes are not mutually orthogonal.

9. The valve of claim 1, wherein the movable control member is in the form of a plug configured to rotate about the second axis.

10. The valve of claim 1, further comprising a rotation sensor for the rotor, the rotation sensor including a magnetosensitive probe secured to a printed circuit outside the cover and at least one magnetic element secured to the rotor inside the cover and configured to generate a magnetic field.

11. The valve of claim 1, further comprising a linear position sensor for a needle, the linear position sensor comprising a magnetosensitive probe and of at least one magnetic element that is secured to the movable control member and generates a magnetic field.

12. The valve of claim 1, wherein the stator of the electrical actuator has only three coils grouped together in an angular sector of less than 180°.

13. The valve of claim 1, wherein the cover comprises a metal cover arranged in the electrical actuator.

14. The valve of claim 1, wherein the cover comprises a plastic wall surrounding the stator of the actuator.

15. The valve of claim 1, wherein the movable control member is configured to rotate about the second axis and the shaft is guided by only two bearings located at the ends thereof.

16. The valve of claim 1, wherein the valve body comprises two cavities accommodating internal movable elements, one of the two cavities extending along the first axis and the other of the two cavities extending along the second axis.

17. The valve of claim 1, wherein the stator and an electronics board are attached to a casing, the stator, electronics board, and casing being fixed to a sealed valve block.

18. The valve of claim 1, further comprising a part forming a seat of a rotary plug or of a needle has a housing intended to receive connection elements of a conduit for heat transport fluid.

19. An expansion device for an air conditioning circuit, comprising: a valve body having a movable control member, an electrical actuator comprising a stator and a rotor, a sealing cover extending from the valve body to the inside of the stator, the sealing cover being positioned at an interface between the rotor and the stator in such a way that the rotor is inside the sealing cover and submerged in a fluid, the stator being isolated from the fluid, the rotor configured to rotate about a first axis and being secured to a shaft extending along the first axis, the movable control member configured to move in a linear manner along a second axis or to rotate about the second axis, the shaft having an end that forms, together with a toothed wheel that drives the movable control member, a gear pair with non-intersecting or intersecting axes, wherein a base of the sealing cover is inserted into the valve body and comprises a groove, a seal member disposed within the groove and providing a fluid-tight seal between the valve body and the base of the sealing cover, and wherein the sealing cover is directly fixed to the valve body.

20. An expansion device for cooling a battery, the expansion device having a valve body comprising a movable control member, an electrical actuator comprising a stator and a rotor, a sealing cover extending from the valve body to the inside of the stator, the sealing cover being positioned at an interface between the rotor and the stator in such a way that the rotor is inside the sealing cover and submerged in a fluid, the stator being isolated from the fluid, the rotor configured to rotate about a first axis and being secured to a shaft extending along the first axis, the movable control member configured to move in a linear manner along a second axis or to rotate about the second axis, the shaft having an end that forms, together with a toothed wheel that drives the movable control member, a gear pair with non-intersecting or intersecting axes, wherein a base of the sealing cover is inserted into the valve body and comprises a groove, a seal member disposed within the groove and providing a fluid-tight seal between the valve body and the base of the sealing cover, and wherein the sealing cover is directly fixed to the valve body.

* * * * *